United States Patent
Kanazawa et al.

(10) Patent No.: US 11,414,007 B2
(45) Date of Patent: Aug. 16, 2022

(54) VEHICLE HEADLIGHT

(71) Applicants: STANLEY ELECTRIC CO., LTD., Tokyo (JP); HONDA MOTOR CO., LTD., Tokyo (JP)

(72) Inventors: Takashi Kanazawa, Tokyo (JP); Ryuichi Nakano, Tokyo (JP)

(73) Assignees: STANLEY ELECTRIC CO., LTD., Tokyo (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/303,979

(22) Filed: Jun. 11, 2021

(65) Prior Publication Data
US 2021/0387566 A1 Dec. 16, 2021

(30) Foreign Application Priority Data
Jun. 15, 2020 (JP) ............... JP2020-102869

(51) Int. Cl.
| | |
|---|---|
| *F21S 41/43* | (2018.01) |
| *B60Q 1/14* | (2006.01) |
| *B60Q 1/00* | (2006.01) |
| *F21S 41/25* | (2018.01) |
| *F21S 41/151* | (2018.01) |
| *F21S 41/143* | (2018.01) |
| *F21W 102/13* | (2018.01) |

(52) U.S. Cl.
CPC ............ *B60Q 1/14* (2013.01); *B60Q 1/0041* (2013.01); *F21S 41/143* (2018.01); *F21S 41/151* (2018.01); *F21S 41/25* (2018.01); *F21W 2102/13* (2018.01)

(58) Field of Classification Search
None
See application file for complete search history.

(56) References Cited

U.S. PATENT DOCUMENTS

| | | | |
|---|---|---|---|
| 2015/0321598 A1* | 11/2015 | Kanayama | F21S 41/24 362/487 |
| 2017/0028903 A1* | 2/2017 | Mochizuki | B60Q 11/00 |
| 2019/0203903 A1* | 7/2019 | Nishimura | F21S 41/43 |

FOREIGN PATENT DOCUMENTS

| | | |
|---|---|---|
| JP | H04-087540 U | 7/1992 |
| JP | 2004-158294 A | 6/2004 |

(Continued)

OTHER PUBLICATIONS

Japanese Office Action for the related Japanese Patent Application No. 2020-102869 dated Apr. 27, 2022.

*Primary Examiner* — Elmito Breval
(74) *Attorney, Agent, or Firm* — Kenealy Vaidya LLP (57) ABSTRACT

To provide a vehicle headlight whose irradiation light is capable of ensuring sufficient illuminance to the immediate front side of the vehicle. A vehicle headlight irradiating light to the front of a vehicle including a first unit which generates light in order to form a first low beam, a second unit which generates light in order to form a high beam and a second low beam, where a portion of the high beam on the lower end side overlaps a portion of the first low beam on the upper side, and the other portion is formed above the first low beam without overlapping the first low beam, and where a portion of the second low beam on the upper side overlaps a portion of the first low beam on the lower side, and the other portion is formed below the first low beam without overlapping the first low beam.

7 Claims, 9 Drawing Sheets

(56) References Cited

FOREIGN PATENT DOCUMENTS

| JP | 2007-134052 A | 5/2007 |
|----|---------------|--------|
| JP | 2012-164515 A | 8/2012 |
| JP | 2018-172038 A | 11/2018 |
| JP | 2019-077348 A | 5/2019 |

* cited by examiner

VEHICLE HEADLIGHT

BACKGROUND

Technical Field

The present disclosure relates to a vehicle headlight for irradiating light to the front of a vehicle.

Description of the Background Art

Japanese Unexamined Patent Publication No. 2018-172038 describes a vehicle headlight having a low beam headlight unit and a high beam headlight unit. In this vehicle headlight, in front of the vehicle, a low beam light distribution pattern is formed relatively downward and a high beam light distribution pattern is formed relatively upward.

Here, for example, when a vehicle equipped with the above-described vehicle headlight has a relatively high vehicle height, since the installed position of the vehicle headlight also becomes relatively high, the illuminance of irradiation light at the immediate front side of the vehicle (for example, in the range of about 5 meters to 15 meters of the vehicle front side) may become low.

In such a case, even when enough illuminance of the vehicle's irradiation light is ensured, in consideration of a psychological aspect of passengers, due to the darkness at the immediate front side of the vehicle, there is a possibility that the passengers receive an impression that the brightness of the entire irradiation light is insufficient. To allow the passengers to receive such an impression is not desirable since it reduces commodity value.

In a specific aspect, it is an object of the present disclosure to provide a vehicle headlight whose irradiation light is capable of also ensuring sufficient illuminance to the immediate front side of the vehicle.

SUMMARY

A vehicle headlight according to one aspect of the present disclosure is (a) a vehicle headlight configured to irradiate light to the front of a vehicle including (b) a first unit configured to generate light in order to form a first low beam, (c) a second unit configured to generate light in order to form a high beam and a second low beam, (d) where a portion of the high beam on the lower end side overlaps a portion of the first low beam on the upper end side, and a portion other than the overlapping portion of the high beam on the lower end side is formed above the first low beam without overlapping the first low beam, and (e) where a portion of the second low beam on the upper end side overlaps a portion of the first low beam on the lower end side, and a portion other than the overlapping portion of the second low beam on the upper end side is formed below the first low beam without overlapping the first low beam, or all portion of the second low beam overlaps the first low beam.

According to the above configuration, a vehicle headlight whose irradiation light is capable of also ensuring sufficient illuminance to the immediate front side of the vehicle is provided.

BRIEF DESCRIPTION OF THE DRAWINGS

FIG. 4B is a diagram which schematically shows a state when the vehicle headlight is turned on.

FIG. 4C is a diagram which schematically shows a state when a vehicle headlight of a comparative example is turned on.

DESCRIPTION OF THE PREFERRED EMBODIMENTS

Figure 1:
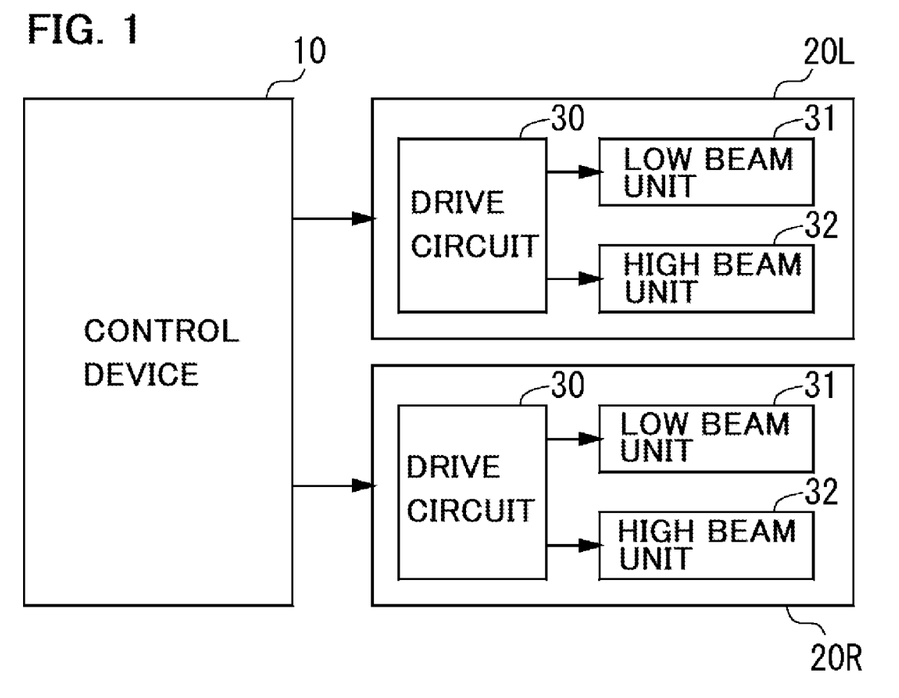
FIG. 1 is a block diagram which shows a configuration of a vehicle headlight according to at least one embodiment.

FIG. 1 is a block diagram which shows a configuration of a vehicle headlight according to at least one embodiment. The illustrated vehicle headlight is configured to include a control device (lighting control device) 10 and a pair of lamp units 20L, 20R.

The control device 10 controls the operation of the pair of lamp units 20L, 20R. The control device 10 is realized by using a computer system having, for example, a CPU, a ROM, a RAM, or the like, and executing a predetermined operation program in the computer system.

The lamp units 20L, 20R are provided on the left and right sides of the front part of the vehicle respectively, and are intended to irradiate the front of the vehicle with light. These lamp units 20L, 20R each have a drive circuit 30, a low beam unit (first unit) 31, and a high beam unit (second unit) 32.

The drive circuit 30 drives the low beam unit 31 and the high beam unit 32 based on a control signal provided from the control device 10.

The low beam unit 31 has, for example, a light source bulb and a reflector, operates by receiving driving power from the drive circuit 30, and generates irradiation light in order to form a low beam by reflecting light emitted from the light source bulb by the reflector and blocking a part of the reflected light using a light shielding plate.

The high beam unit 32 receives driving power from the drive circuit 30 to generate irradiation light in order to form a high beam, and further generates irradiation light in order to form an additional low beam (second low beam) which is different from the low beam (first low beam) formed by the low beam unit 31 described above. Here, the additional low beam in the present embodiment is a light for irradiating the immediate front side region which is closer to the vehicle than the low beam.

Figure 2:
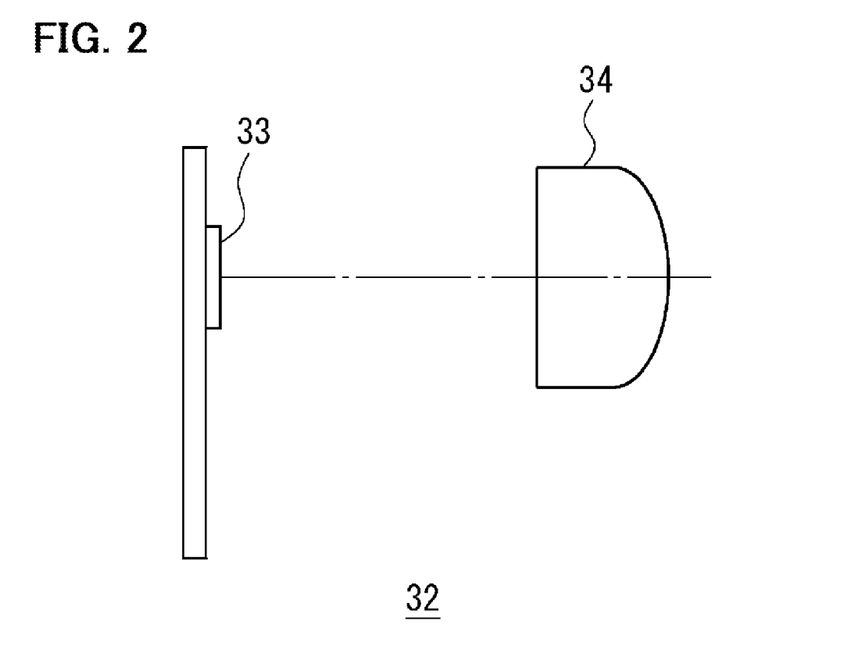
FIG. 2 is a diagram which shows a configuration example of a high beam unit.

Referring to a configuration example shown in FIG. 2, the high beam unit 32 has a light source 33 having a plurality of light emitting elements (LEDs) configured to generate irradiation light for a high beam and a plurality of light emitting elements (LEDs) configured to generate irradiation light for the additional low beam, and a lens 34 configured to form a high beam and the additional low beam by condensing and reverse-projecting the light emitted from these light emitting elements.

Figure 3:
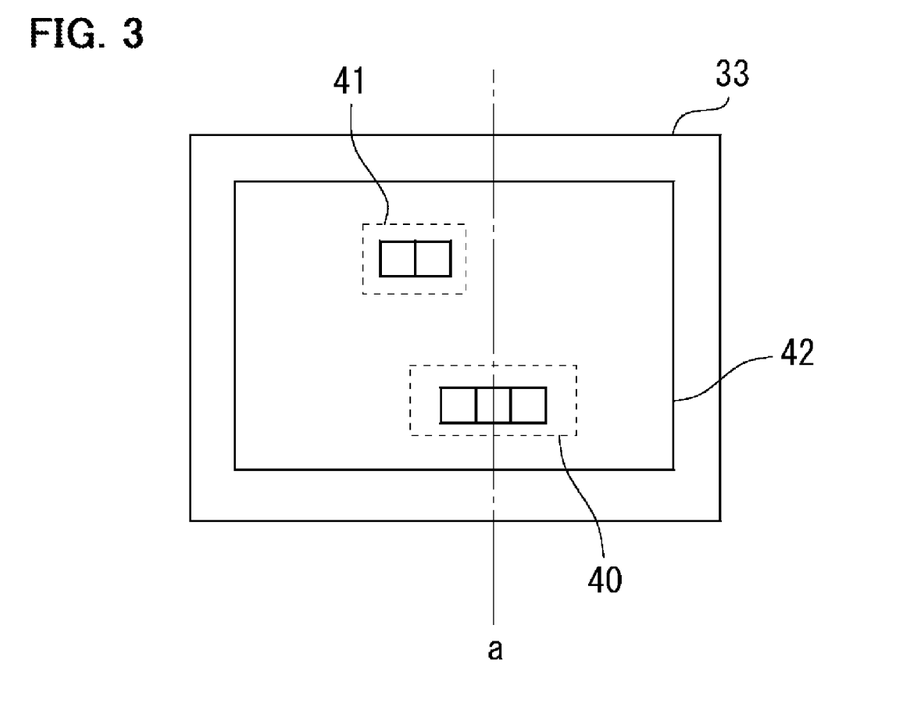
FIG. 3 is a schematic plan view which shows a configuration of a light source of a high beam unit.

FIG. 3 is a schematic plan view which shows a configuration of a light source of the high beam unit. The illustrated light source 33 is configured to include a high beam chip group 40 having a plurality of light emitting elements (first light emitting elements), an additional low beam chip group 41 having a plurality of light emitting elements (second light emitting elements), and a substrate 42 on which these are mounted. In the illustrated example, the high beam chip group 40 has three light emitting elements arranged along the left-right direction in the figure. Further, the additional low beam chip group 41 has two light emitting elements arranged along the left-right direction in the figure. Thus, in the present embodiment, the high beam chip group 40 and the additional low beam chip group 41 are mounted on the same substrate 42.

The high beam chip group 40 is arranged near the focal point of lens 34 (refer to FIG. 2). Further, the additional low beam chip group 41 is arranged, in a plan view, on the upper side in the figure with respect to the high beam chip group 40, and with reference to the position "a" which is the center of the high beam chip group 40 in the left-right direction, the additional low beam chip group 41 is arranged to offset closer to the center of the vehicle than the center position "a" (for example, in the case of the left lamp unit 20L, in the vehicle left-right direction, the additional low beam chip group 41 is offset toward the right side position). As a result, since the light emitted from the additional low beam chip group 41 is irradiated to the region toward the outer-side in front of the vehicle, for example, visibility of a white line, etc. on the road can be improved.

Figure 4A:
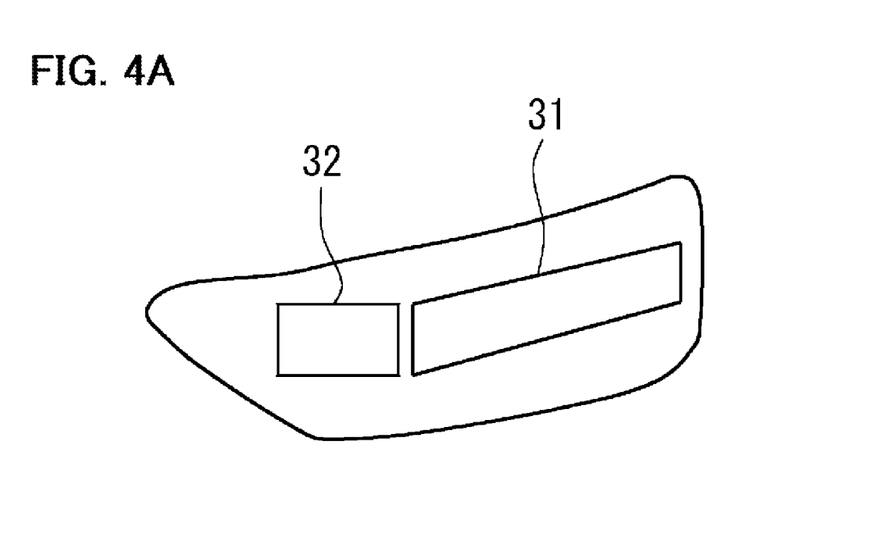
FIG. 4A is a schematic plan view which shows the external configuration of a vehicle headlight.

FIG. 4A is a schematic plan view which shows the external configuration of a vehicle headlight. The figure shows a vehicle headlight which is installed on the front left side of the vehicle and viewed from the front of the vehicle. Here, since the vehicle headlight installed on the front right side of the vehicle and the vehicle headlight shown in the figure are bilaterally symmetrical, the illustration thereof is omitted here. As shown, the low beam unit 31 is located relatively toward the outer-side of the vehicle, and the high beam unit 32 is located relatively toward the inner-side of the vehicle.

Figure 4B:
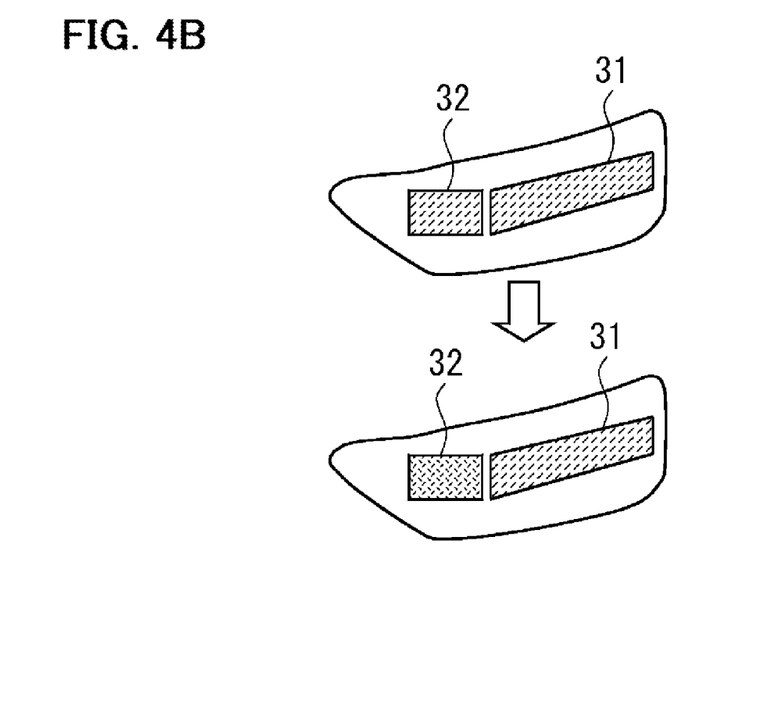
Figure 4C:
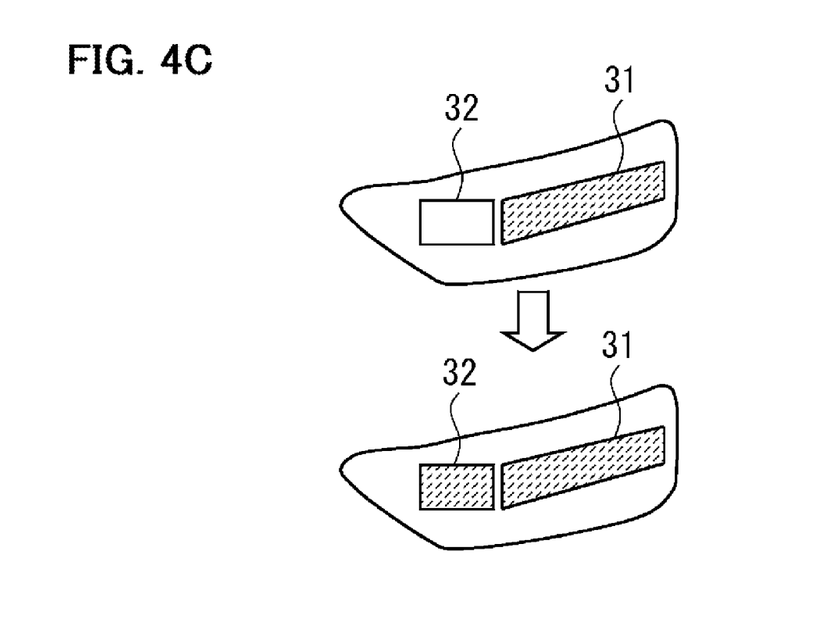

FIG. 4B is a diagram which schematically shows a state when the vehicle headlight is turned on. Here, in the diagram, the lighting state is expressed in a pattern. In the vehicle headlight of the present embodiment, an additional low beam is formed in both cases in which a high beam is formed and not formed. Therefore, regardless of whether a high beam is formed (lower part of the figure) or not formed (upper part of the figure), appearance-wise, since light is always generated from both the low beam unit 31 and the high beam unit 32, as a whole vehicle headlight, a continuous beam of irradiation light is always viewed. On the contrary, in the vehicle headlight of a comparative example which is not configured to irradiate an additional low beam, as shown in FIG. 4C, depending on whether a high beam from the high beam unit 32 is formed (lower part of the figure) or not formed (upper part of the figure), appearance-wise, the range (area) of irradiation light differs. Therefore, in the vehicle headlight of the present embodiment, when lights are turned on, the exterior design of the vehicle headlight can be improved.

FIGS. 5A to 5D are diagrams that illustrates a high beam, a low beam and an additional low beam formed by the vehicle headlight. In FIGS. 5A to 5D, the shape and arrangement of each beam are schematically shown on a virtual screen at a predetermined position in front of the own vehicle (for example, a position 25 meters in front of the own vehicle).

Figure 5A:
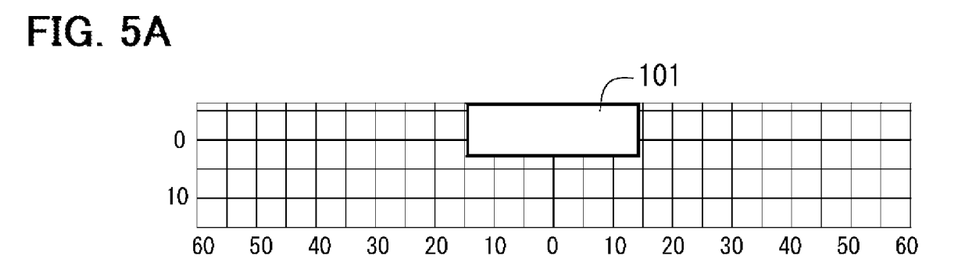
FIGS. 5A to 5D are diagrams that illustrate a high beam, a low beam and an additional low beam formed by the vehicle headlight.

FIG. 5A is a diagram which shows a high beam formed by each high beam unit 32 of the lamp units 20L, 20R. The illustrated high beam 101 is formed in a range of about 15° to the left and right using the front of the lamp (horizontal axis 0°) as a reference, and is formed in the range of a position slightly below (approximately 2° downward from the horizontal line) the horizontal line (vertical axis 0°) to a position above the horizontal line (5 to 6° above the horizontal line). The high beam 101 is formed by superimposing lights from the high beam chip group 40 of each high beam unit 32 into one.

Figure 5B:
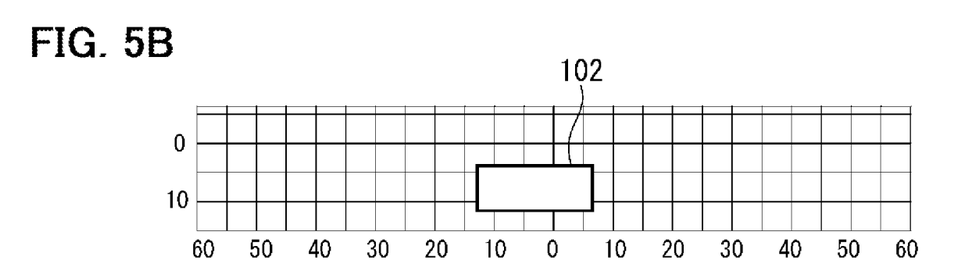

FIG. 5B is a diagram which shows an additional low beam formed by each high beam unit 32 of the lamp units 20L, 20R. The illustrated additional low beam 102 is formed in a range of about 7° to the right and about 13° to the left using the front of the lamp (horizontal axis 0°) as a reference, and is formed in the range of of about 4° to about 7° downward from the horizontal line (vertical axis 0°). The additional low beam 102 is formed by superimposing lights from the additional low beam chip group 41 of each high beam unit 32 into one.

Figure 5C:
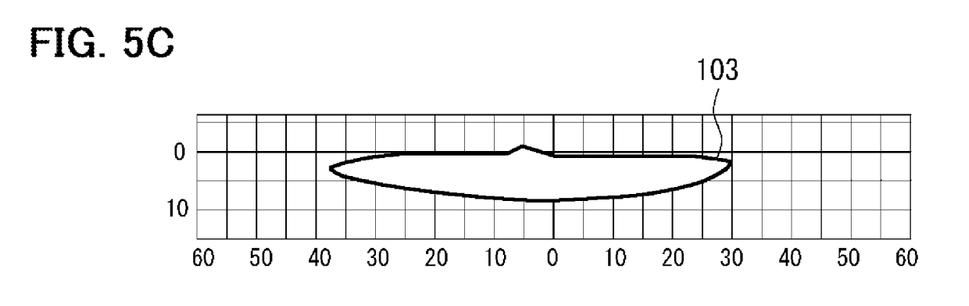

FIG. 5C is a diagram which shows a low beam formed by each low beam unit 31 of the lamp units 20L, 20R. The illustrated low beam 103 is formed in a range of about 30° to the right and about 38° to the left using the front of the lamp (horizontal axis 0°) as a reference, and is formed in the range of about 4° to 8° downward from the horizontal line (vertical axis 0°). The low beam 103 has a cut-off shape on the upper end side toward the center left. Further, the low beam 103 has a shape in which the lower end side gradually rises from the center to the left and right. The low beam 103 is formed by superimposing lights from each low beam unit 31 into one.

Figure 5D:
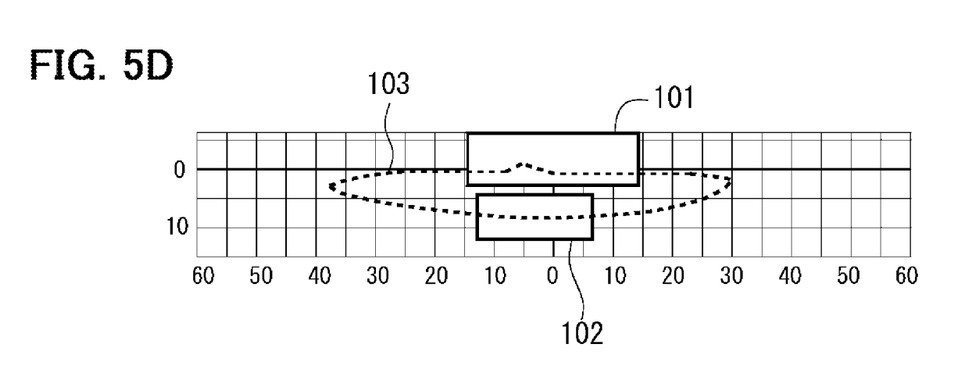

FIG. 5D is a diagram which show a state in which a high beam, a low beam, and an additional low beam are superimposed. As shown, the high beam 101 is formed so as to slightly overlap a part of the upper end side region of the low beam 103 and not to overlap the additional low beam 102. A portion of the upper end side of the additional low beam 102 partially overlaps the low beam 103, and a portion of the lower end side of the additional low beam 102 does not overlap the low beam 103 and is formed further below the lower end of the low beam 103. Further, the additional low beam 102 is formed with a narrower width than the high beam 101. The maximum luminous intensity of the low beam 103 is configured between 0.5° and 2° downward from the horizontal line and has a clear cutoff. On the contrary, the maximum luminous intensity of the additional low beam 102 is configured between 5° and 10° downward from the horizontal line and 10° to the left and right, and the additional low beam 102 straddles the V line (line with a horizontal axis of 0°) and does not have a clear cutoff. According to such a light distribution pattern, it is possible to effectively irradiate the immediate front of the vehicle which is further to the front than the irradiation range of the low beam 103, and effectively irradiate the lane, etc. on the left side of the vehicle. Here, the additional low beam 102 may be formed so that its whole irradiation range overlaps that of the low beam 103. In such a case, it is desirable that the additional low beam 102 is formed to overlap the lower region of the low beam 103 (for example, a region below the center in the vertical direction).

Figure 6A:
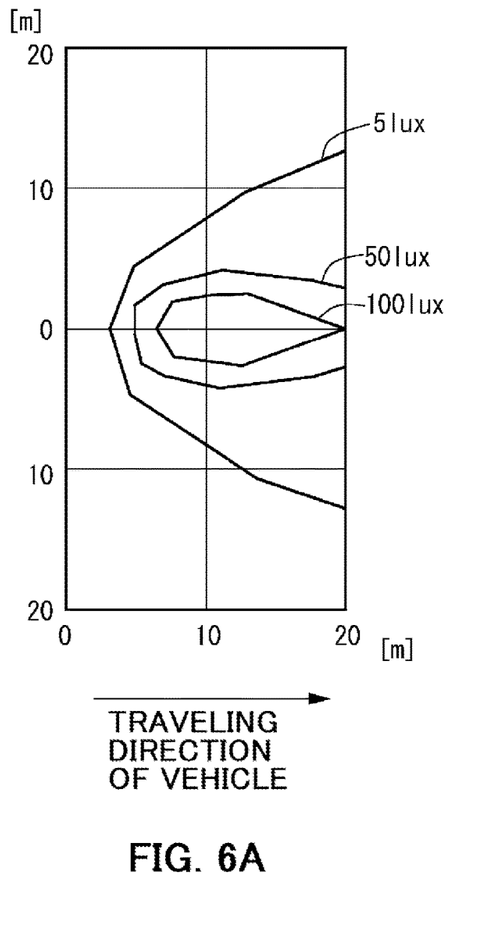
FIG. 6A is a diagram which shows an example of illuminance distribution of irradiation light formed by vehicle headlight.
Figure 6B:
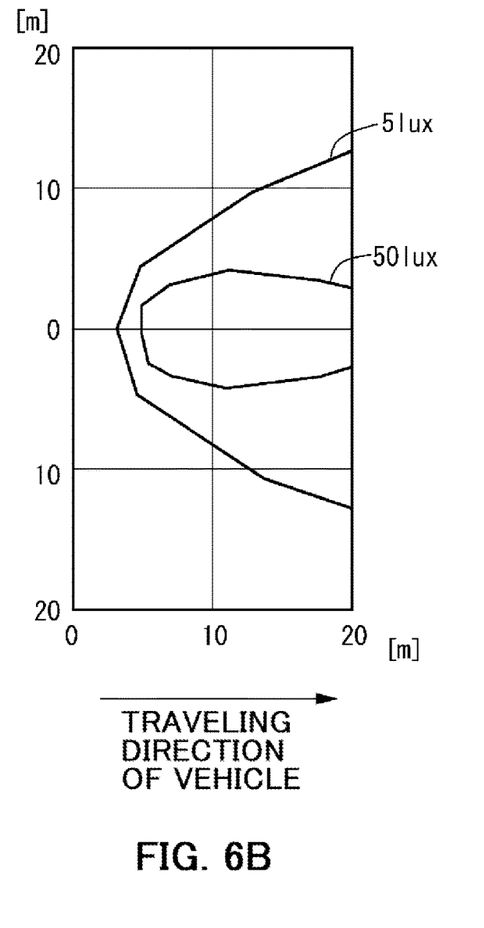
FIG. 6B is a diagram which shows an example of illuminance distribution of irradiation light formed by the vehicle headlight of a comparative example.

FIG. 6A is a diagram which shows an example of illuminance distribution of irradiation light formed by the vehicle headlight. Further, FIG. 6B is a diagram which shows an example of illuminance distribution of irradiation light formed by the vehicle headlight of the comparative example which is not configured to irradiate an additional low beam. In each figure, an example of illuminance distribution of irradiation light is shown in the range of 20 meters ahead from the vehicle position (0 meter) along the traveling direction of the vehicle, and in the range of 20 meters to the left and right. As shown in FIG. 6A, in the vehicle headlight of the present embodiment, in addition to irradiation light mainly formed by a low beam (range of 5 lux to 50 lux) and irradiation light mainly formed by a high beam (range of 50 lux to 100 lux), irradiation light of 100 lux or more is formed in a narrow area in the center of the front of the vehicle. As a result, for example, the illuminance on the immediate front side of the vehicle can be increased by up to 80 lux by irradiating the additional low beam when the vehicle is traveling at low speed. Further, when driving in the rain, even when an additional low beam is irradiated, since the immediate front side of the vehicle is intensively irradiated by the additional low beam, the duration of time in which the driver of the oncoming vehicle is subject to glare due to the reflected light on the wet road surface can be reduced. On the contrary, in the comparative example shown in FIG. 6B, the advantage of the additional low beam as described above cannot be obtained.

Figure 7:
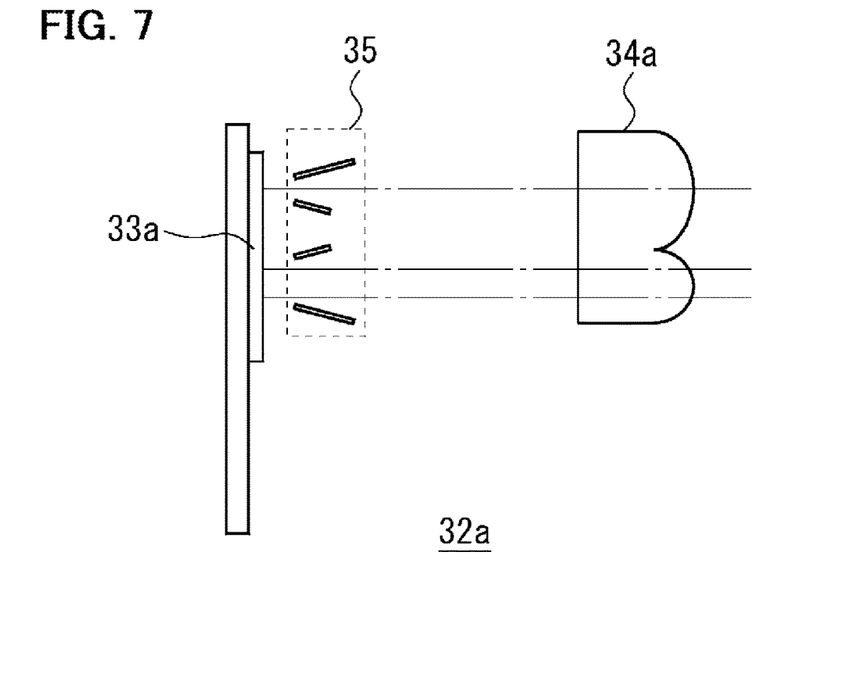
FIG. 7 is a diagram which shows a configuration of optical elements of a vehicle headlight of a modified example.

FIG. 7 is a diagram which shows a configuration of optical elements of a vehicle headlight of a modified example. Here, since the configuration of the drive circuit and the like is the same as that of the above-described embodiment, the description thereof will be omitted. The vehicle headlight of the modified example is configured to include a light source 33a provided with a plurality of light emitting elements (LEDs), a lens 34a which forms a high beam, etc. by condensing and reverse-projecting the light generated by these light emitting elements, and a reflector 35 having a plurality of reflecting surfaces arranged in front of the light source 33a where the plurality of reflecting surfaces reflects the light which is emitted from the light source 33a and spreads and travels without entering lens 34a such that it returns to lens 34a. The reflector 35 is intended to improve the uniformity of the illuminance on the road surface of the additional low beam and to improve the light utilization efficiency so that the additional low beam can be irradiated over a wide range. Further, lens 34a is divided into two stages as an optical system, and is designed to combine the light incident on the upper stage and the light incident on the lower stage to form irradiation light.

Figure 8:
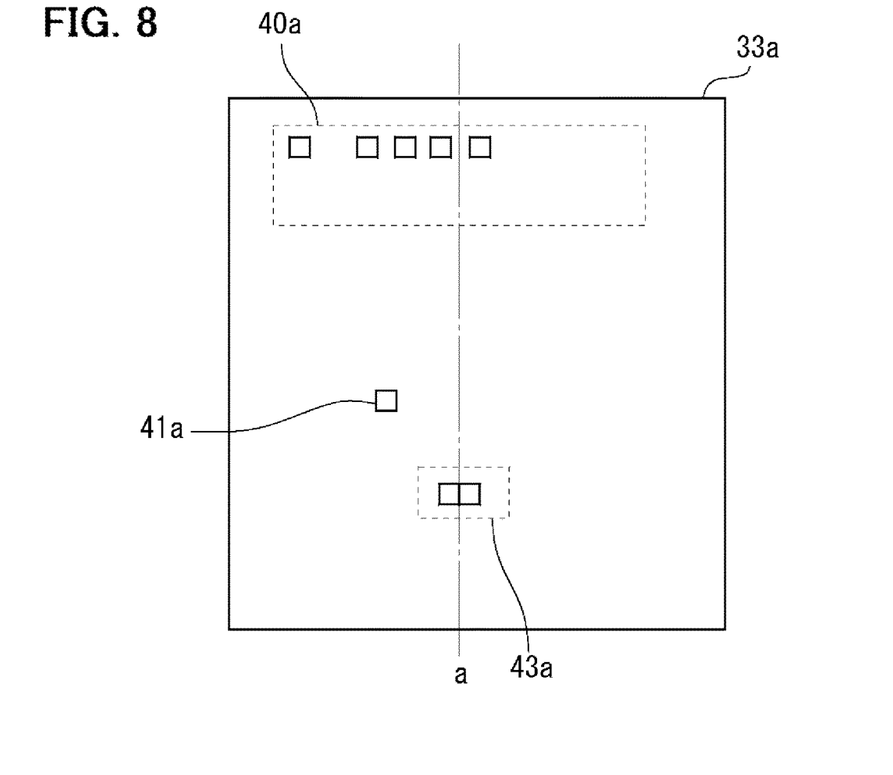
FIG. 8 is a schematic plan view which shows a configuration of a light source of a high beam unit of the vehicle headlight of a modified example.

FIG. 8 is a schematic plan view which shows a configuration of a light source of the high beam unit of the vehicle headlight of the modified example. The illustrated light source 33a is configured to include an ADB chip group 40a having a plurality of light emitting elements, an additional low beam chip 41a having one light emitting element, and an additional high beam chip group 43a having two light emitting elements. Here, the ADB chip group 40a generates irradiation light to form a high beam (hereinafter referred to as a "selective high beam") having a light distribution pattern in which a dimming region is set by the control unit 10 according to the position of an oncoming vehicle or the like existing in front of the vehicle which is photographed by a camera (not shown).

Further, the additional high beam chip group 43a is configured to emit irradiation light to form an additional high beam in the front upper direction of the vehicle. In the illustrated example, the ADB chip group 40a is configured to include five light emitting element chips arranged along the left-right direction in the figure. Further, the additional high beam chip 43a is configured to include two light emitting element chips arranged along the left-right direction in the figure. Thus, in the modified example as well, the ADB chip group 40a, the additional low beam chip 41a, and the additional high beam chip group 43a are all mounted on a common substrate.

The ADB chip group 40a is arranged near the focal point of lens 34a in the upper stage of the figure. Further, the additional low beam chip 41a is arranged below the ADB chip group 40a in the figure. The additional high beam chip group 43a is arranged below the additional low beam chip 41a in the figure. Further, similar to the above-described embodiment, with reference to the position "a" which is the center of the ADB chip group 40a and the additional high beam chip group 43a in the left-right direction, the additional low beam chip 41a is arranged to offset closer to the center of the vehicle than the center position "a" (for example, in the case of the lamp unit 20R on the right side, a position toward the left side of the vehicle).

Figure 9:
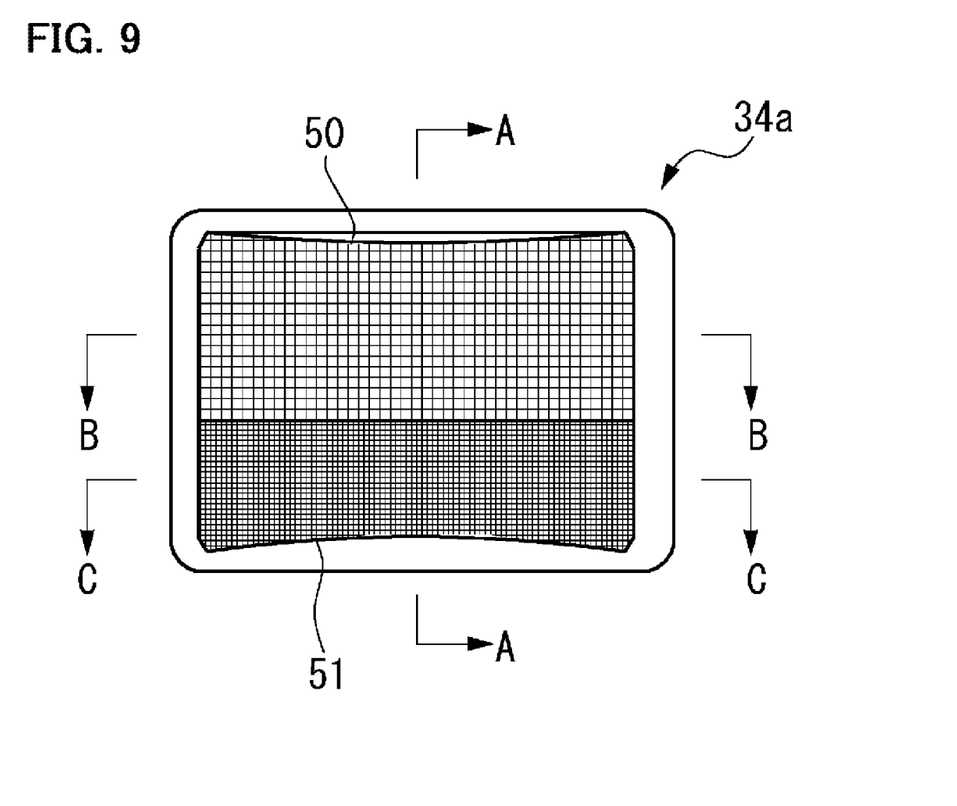
FIG. 9 is a schematic front view which shows a configuration example of a lens in a vehicle headlight of a modified example.
Figure 10A:
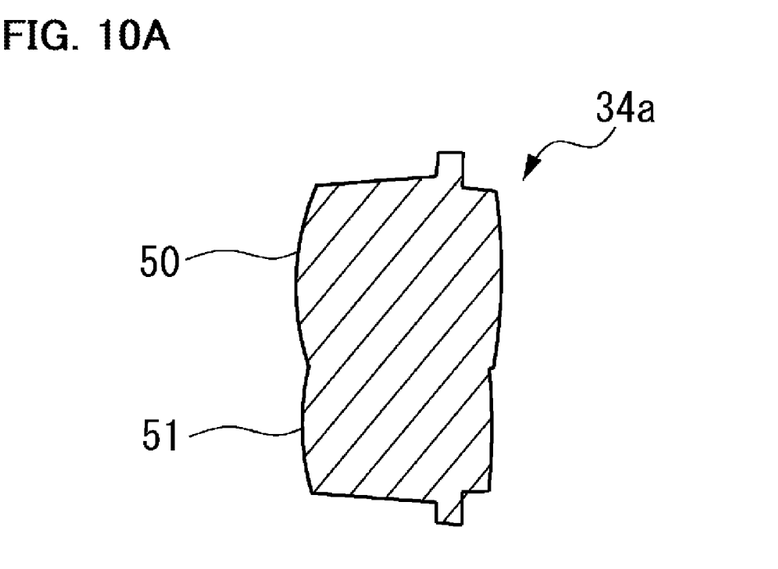
FIG. 10A is a cross-sectional view of section A-A shown in FIG. 9.
Figure 10B:
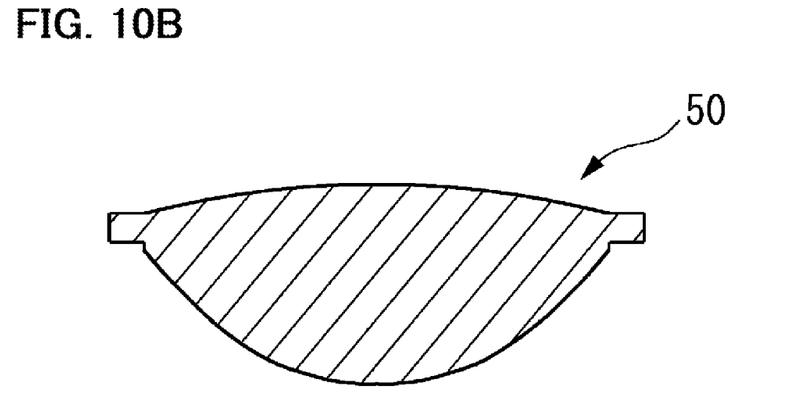
FIG. 10B is a cross-sectional view of section B-B shown in FIG. 9.
Figure 10C:
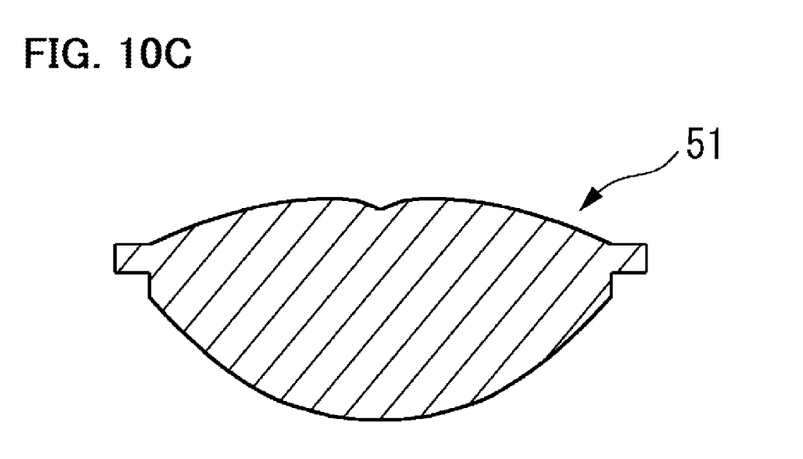
FIG. 10C is a cross-sectional view of section C-C shown in FIG. 9.

FIG. 9 is a schematic front view which shows a configuration example of a lens in the vehicle headlight of the modified example. FIG. 10A is a cross-sectional view of section A-A shown in FIG. 9, FIG. 10B is a cross-sectional view of section B-B shown in FIG. 9, and FIG. 10C is a cross-sectional view of section C-C shown in FIG. 9. As shown in FIGS. 9 and 10A, lens 34a includes an upper stage portion 50 and a lower stage portion 51. Of these, the upper stage portion 50 has a general convex lens shape as shown in FIG. 10B, and has a function of condensing light in the vicinity of the focal point. The light emitted from the ADB chip group 40a described above is incident on the upper stage portion 50. As a result, irradiation light for ADB is irradiated with a desired light distribution pattern while increasing central luminous intensity. Further, as shown in FIG. 10C, the lower stage portion 51 has two convex shapes on the surface (light incident surface) on the side closer to the light source 33a. The lower stage portion 51 has an effect of spreading light to the left and right (diffusion effect), and lights emitted from the above-described additional low beam chip 41a and the additional high beam chip group 43a are incident thereon. As a result, an additional high beam is irradiated over a wide range to the front upper direction of the vehicle, and the additional low beam is irradiated over a wide range to the immediate front side of the vehicle.

Figure 11A:
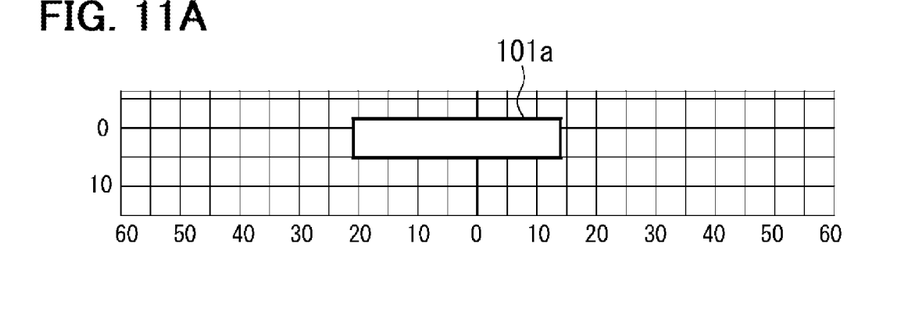
FIGS. 11A to 11C are diagrams that illustrate a selective high beam, a low beam, an additional low beam, and an additional high beam formed by the vehicle headlight of a modified example.
Figure 11B:
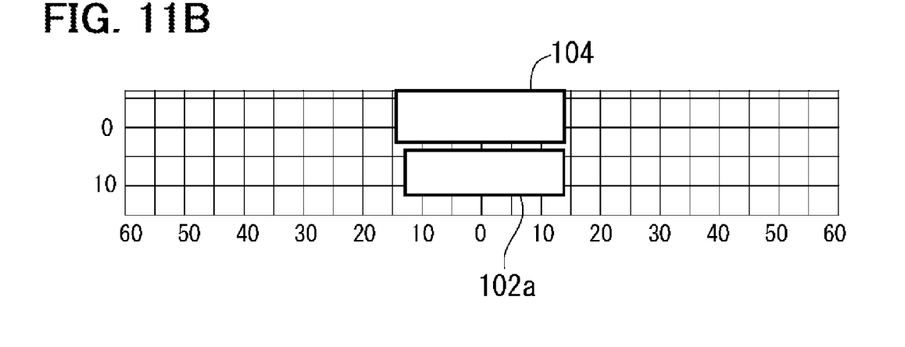
Figure 11C:
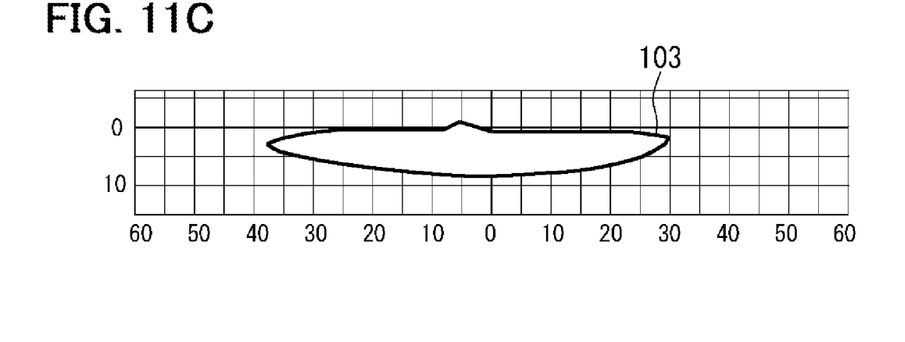

FIGS. 11A to 11C are diagrams that illustrate a selective high beam, a low beam, an additional low beam, and an additional high beam formed by the vehicle headlight of the modified example. In FIGS. 11A to 11C, the shape and arrangement of each beam are schematically shown on a virtual screen at a predetermined position in front of the own vehicle (for example, a position 25 meters in front of the own vehicle).

FIG. 11A is a diagram which shows a selective high beam formed by each high beam unit 32 of the lamp units 20L, 20R. The illustrated selective high beam 101a is formed in a range of about 14° to the right and about 21° to the left using the front of the lamp (horizontal axis 0°) as a reference, and is formed in the range of a position slightly higher (position around +2°) than the horizontal line (vertical axis 0°) to a position lower than the horizontal line (5 to 6° below the horizontal line). The selective high beam 101a is formed by superimposing lights from each high beam unit 32 into one. Here, in the illustrated example, a case of irradiating the entire range is shown but when an oncoming vehicle or the like is present, according to the position thereof, a portion of the entire range is appropriately controlled to become a dimmed state (or a non-irradiated state).

FIG. 11B is a diagram which shows an additional low beam and an additional high beam formed by each high beam unit 32 of the lamp units 20L, 20R. The illustrated additional low beam 102a is formed in a range of about 14° to the right and about 13° to the left using the front of the lamp (horizontal axis 0°) as a reference, and is formed in the range of of about 4° to about 12° downward from the horizontal line (vertical axis 0°). The additional low beam 102a is formed by superimposing lights from each high beam unit 32 into one. Further, the illustrated additional high beam 104 shown i is formed in a range of about 14° to the right and about 15° to the left using the front of the lamp (horizontal axis 0°) as a reference, and is formed in the range of of about 2.5° below the horizontal line (vertical axis 0°) to about 6° above the the horizontal line. The additional high beam 104 is formed by superimposing lights from each high beam unit 32 into one.

FIG. 11C is a diagram which shows a low beam formed by each low beam unit 31 of the lamp units 20L, 20R. The illustrated low beam 103 is formed in the same manner as the above-described embodiment. In this modified example as well, the low beam 103 has a maximum luminous intensity at between 0.5° to 2° downward from the horizontal line and has a clear cutoff. On the contrary, the above-described additional low beam 102 has a maximum luminous intensity at between 5° to 10° downward from the horizontal line and 10° to the left and right, straddles the V line (horizontal axis 0° line) and does not have a clear cutoff. According to such a light distribution pattern, it is possible to effectively irradiate the immediate front of the vehicle which is further to the front than the irradiation range of the low beam 103, and effectively irradiate the lane, etc. on the left side of the vehicle.

Figure 12:
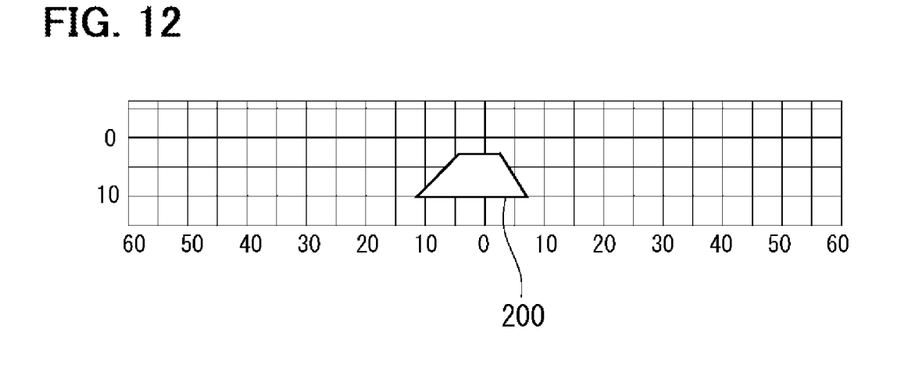
FIG. 12 is a diagram that illustrates a desirable irradiation range for an additional low beam.

FIG. 12 is a diagram that illustrates a desirable irradiation range for the additional low beam. Also in FIG. 12, the shape and arrangement of each beam are schematically shown on a virtual screen at a predetermined position in front of the own vehicle (for example, a position 25 meters in front of the own vehicle). Here, the irradiation range of the additional low beam 200 irradiated by the lamp unit 20L installed on the left side of the vehicle is shown, and the irradiation range of the lamp unit 20R on the right side is formed to be bilaterally symmetrical. As illustrated, in order to preferably irradiate a width of 5 meters to 15 meters in front of the vehicle and 3.5 meters to the left and right of the vehicle, it is preferable that the lamp unit 20L is capable of irradiating at 300 candela or more over the entire trapezoidal region defined by line segments of 10° downward and 11° leftward to 10° downward and 8° rightward, 3.5° downward and 4° leftward to 3.5° downward and 3° rightward. Considering both left and right lamp units as a whole, it is preferable to design the vehicle headlight so that it is capable of irradiating at 300 candela or more over the entire trapezoidal region defined by line segments of 10° downward and 8° leftward to 8° rightward, and 3.5° downward and 3° leftward to 3° rightward.

According to the above embodiments or the like, a vehicle headlight whose irradiation light is capable of ensuring sufficient illuminance to the immediate front side of the vehicle is provided.

It should be noted that the above disclosure is not limited to the subject matter of the foregoing embodiments, and can be implemented by being variously modified within the scope of the present disclosure as defined by the appended claims. For example, in the above-described embodiments or the like, brightness of irradiation light by the additional low beam may be set variably according to the vehicle speed. For example, in a case where vehicle speed range is defined as high speed (e.g., at 80 km/h or more), medium speed (e.g., from 40 km/h to 80 km/h), and low speed (e.g., at 40 km/h or less), it is conceivable that irradiation is controlled so that the higher the vehicle speed range, the brighter the light. Further, while driving a curved road, in a case where the vehicle headlight irradiates the driving direction according to the steering angle of the vehicle, irradiation light may be formed by the high beam unit.

Further, the optical system (direct projection optical system) described in the above embodiments or the like is merely an example, and the configuration of the optical system is not limited thereto.

The present application is based on, and claims priority from, JP Application Serial Number, 2020-102869 filed on Jun. 15, 2020, the disclosure of which is hereby incorporated by reference herein in its entirety.

DESCRIPTION OF THE REFERENCE NUMERALS

10: Control unit
20L, 20R: Lamp unit
30: Drive circuit
31: Low beam unit
32: High beam unit
33: Light source
34: Lens
40: High beam chip group
41: Additional low beam chip group
42: Substrate
101: High beam
102: Additional low beam
103: Low beam

What is claimed is:

1. A vehicle headlight configured to irradiate light to the front of a vehicle comprising:
a first unit configured to generate light in order to form a first low beam,
a second unit configured to generate light in order to form a high beam and a second low beam,
wherein a portion of the high beam on the lower end side overlaps a portion of the first low beam on the upper end side, and a portion other than the overlapping portion of the high beam on the lower end side is formed above the first low beam without overlapping the first low beam, and
wherein a portion of the second low beam on the upper end side overlaps a portion of the first low beam on the lower end side, and a portion other than the overlapping portion of the second low beam on the upper end side is formed below the first low beam without overlapping the first low beam, or all portion of the second low beam overlaps the first low beam.

2. The vehicle headlight according to claim 1, wherein the high beam and the second low beam are formed so as not to overlap each other.

3. The vehicle headlight according to claim 1, wherein the second low beam is formed with a width narrower than that of the high beam.

4. The vehicle headlight according to claim 1, wherein the second low beam is formed at least on the road surface in front of the vehicle in a range of 5 meters to 15 meters from the vehicle along the front-rear direction of the vehicle and in a range of 3.5 meters in the left-right direction of the vehicle.

5. The vehicle headlight according to claim 1, wherein the second unit is configured to individually form each of the high beam and the second low beam, and regardless of whether or not the high beam is formed, the low beam is formed by the first unit and the second low beam is formed by the second unit.

6. The vehicle headlight according to claim 1, wherein the first unit and the second unit are arranged next to each other in the front part of the vehicle along the left-right direction of the vehicle.

7. The vehicle headlight according to claim 1, wherein the second unit is configured to include a plurality of light emitting elements mounted on a substrate, wherein the plurality of light emitting elements is configured to include one or a plurality of first light emitting elements used to irradiate the high beam and one or a plurality of second light emitting elements used to irradiate the second low beam, and wherein, in a plan view, the one or the plurality of second light emitting elements is arranged at a position offset to the left-right direction of the vehicle using the one or the plurality of first light emitting elements as a reference.

* * * * *